UNITED STATES PATENT OFFICE 2,426,725

ESTERS OF ENDOETHYLENE-SUBSTITUTED CYCLOPENTANOLS

Herman A. Bruson, Philadelphia, Pa., assignor to The Resinous Products & Chemical Company, Philadelphia, Pa., a corporation of Delaware No Drawing. Application June 9, 1944, Serial No. 539,593

7 Claims. (Cl. 260—487)

This invention relates to addition-rearrangement products of organic carboxylic acids and adducts of cyclopentadiene with mono-olefinic compounds having at least three carbon atoms, said products being esters of an endoethylene-substituted cyclopentanol.

In co-pending application, Serial No. 476,639, filed February 20, 1943, which issued on February 26, 1946, as United States Patent No. 2,395,452, it is shown that adducts of cyclopentadiene with itself, such as dicyclopentadiene, tricyclopentadiene, and tetracyclopentadiene, add organic carboxylic acids in the presence of acidic catalysts to form addition-rearrangement products which are esters of a new ring system termed the "nordicyclopentadiene" or "norpolycyclopentadiene" ring system.

In accordance with the present invention, which is a continuation-in-part of co-pending application Serial No. 531,763, filed April 19, 1944, which issued on August 7, 1945, as United States Patent No. 2,381,433, adducts of cyclopentadiene with mono-olefinic compounds having at least three carbon atoms in the molecule are reacted with organic carboxylic acids in the presence of acidic condensing agents to form addition products which are rearranged esters of endoethylene-substituted cyclopentanols, which may be considered closely related to the above-mentioned norcyclopentadiene ring systems.

A typical illustration is the reaction of an acid, R—COOH, with the cyclopentadiene-styrene adduct.

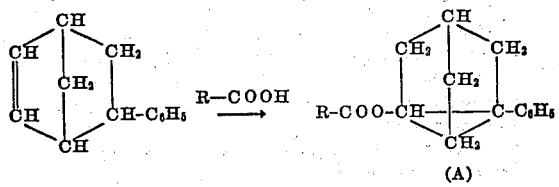

(A)

or

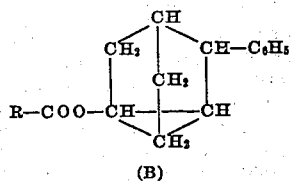

(B)

The product formed by the molecular addition-rearrangement is very probably that represented by (A) although formula (B) is also a possibility. Thus far it has not been possible to decide definitely between the two. In any event, the product is not a simple addition of R—COO— to one side of the double bond and of H to the other. Similar considerations apply to all the reactions herein set forth.

The above products are defined by the empirical formula $$RCOO.C_7H_{10}.C_6H_5$$

wherein —$C_7H_{10}$— represents the rearranged cycles from the adduct from cyclopentadiene and styrene and R represents the residue of a carboxylic acid, RCOOH. In place of the —$C_6H_5$ group, which specifically here results from styrene as a component, there may occur the non-olefinic portion or residue obtained when one of the other mono-olefinic compounds recited below is added to cyclopentadiene. If R' represents this residue, the formula may then be written $$RCOO.C_7H_{10}.R'$$

In the case of a polycarboxylic acid, one or more molecules of an adduct of cyclopentadiene and a mono-olefinic compound of at least three carbon atoms may be reacted with each molecule of the acid. In some cases mixtures of esters are frequently formed. For example, oxalic acid may react with one or with two molecules of an adduct to form a half-ester and a di-ester, ROCOCOOH and ROCOCOOR, respectively.

Various adducts of cyclopentadiene with mono-olefinic compounds having three or more carbon atoms in the molecule can be used for the purpose of this invention. These comprise the so-called "Diels-Alder" type of adducts of cyclopentadiene with unsaturated hydrocarbons such as propylene, cyclopentene, styrene, indene, allylbenzene, and the like; these also comprise the adducts of cyclopentadiene with unsaturated alcohols, esters, halides, or ketones, for example, allyl alcohol, crotonyl alcohol, allyl chloride, allyl benzoate, allyl acetate, allyl oleate, vinyl methyl ketone, vinyl acetate, vinyl benzoate and the like. Other adducts of cyclopentadiene with olefinic compounds, such as coumarone, safrole, eugenol, and with allyl or crotonyl ethers, for example benzyl allyl ether, phenyl allyl ether, octyl allyl ether and the like, may also be used.

The adducts of cyclopentadiene with the unsaturated hydrocarbons recited above, propylene, $CH_2$=$CH \cdot CH_3$, cyclopentene

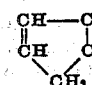

styrene, $CH_2$=$CH \cdot C_6H_5$, indene

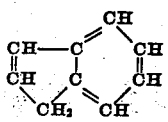

and allyl benzene, $CH_2=CH \cdot CH_2C_6H_5$, or the other adducts which are shown, may be termed 1,4-endomethylene-2-cyclohexenes or bicyclo-(2,2,1)-heptenes, with the double bond assigned to either the 2-position or the 5-position. The adduct is substituted with the non-olefinic residue from the above hydrocarbons, $-CH_3$, $-C_3H_6-$, $-C_6H_5$, $-C_7H_6-$, and $-CH_2C_6H_5$, respectively, which are represented by R' in the general formula given above.

In practicing this invention, it has been found that a wide variety of organic carboxylic acids containing one or more carboxyl groups may be employed. These may be aliphatic, arylaliphatic, cycloaliphatic, aromatic, hydroaromatic, or heterocyclic, and may be saturated or unsaturated in character. It has also been established that the organic non-carboxyl portion of the reacting carboxylic acid compound may contain a wide variety of groups or substituents, for example, halogen, cyano, thiocyano, nitro, keto or acyl, mercapto, ether, acyloxy, alkoxy, aryloxy, carbalkoxy, hydroxy or other relatively inert radicals.

It should be noted at this point that, in the case of carboxylic acids having free hydroxyl or mercapto groups, excess cyclopentadiene-olefine adduct may be necessary since etherification of the free hydroxyl or mercapto group occurs in addition to esterification of the free carboxyl group.

Typical useful organic carboxylic acids for the purpose of this invention are the following:

Formic, acetic, propionic, butyric, isobutyric, valeric, capric, 2-ethyl butyric, 2-ethyl hexoic, lauric, palmitic, stearic, oleic, linoleic, linolenic, ricinoleic, elaeostearic, licanic, abietic, glycollic, lactic, alpha-hydroxyisobutyric, chloroacetic, dichloroacetic, trichloroacetic, beta-chloropropionic, alpha-chloropropionic, thioglycollic, acrylic, crotonic, alpha-methyl acrylic, ethoxyacetic, phenoxyacetic, benzoic, naphthenic, and furoic acids. Among the polycarboxylic acids, oxalic, succinic, maleic, phthalic, adipic, azelaic, and sebacic are the most useful.

The acidic condensing agents which serve as catalysts for promoting the addition-rearrangement of carboxylic acids with adducts of cyclopentadiene and olefines having at least three carbon atoms are boron trifluoride and its coordination complexes with oxygenated compounds such as ethers, as typified by $BF_3 \cdot C_2H_5-O-C_2H_5$, carboxylic acids as typified by $BF_3 \cdot 2CH_3COOH$, or other oxygenated organic compounds including ketones, alcohols, esters, fluoboric acid, dihydroxyfluoboric acid, sulfuric acid, acid esters of sulfuric acid such as ethyl acid sulfate, sulfonic acids such as benzene sulfonic acid or butyl sulfonic acid and other strongly acidic materials such as stannic chloride, aluminum chloride, boron chloride, and the like.

Of these various catalysts, boron trifluoride and its coordination complexes, particularly those with ethers and carboxylic acids are preferred. As examples of the coordination complexes, there may be cited those with diethyl ether and with dibutyl ether, exemplified by $BF_3 \cdot O(C_2H_5)_2$ and $BF_3 \cdot O(C_4H_9)_2$; with acetic or chloroacetic acid typified by $BF_3 \cdot 2CH_3COOH$ or $BF_3 \cdot 2ClCH_2COOH$, and with water which complex may be represented by the formula $BF_3 \cdot (H_2O)_x$ where $x$ is one or two.

The quantity of active catalyst employed may be varied over a wide range. Good results have been obtained with as little as two per cent of catalyst, based on the weight of the cyclopentadiene-olefine adduct, up to and exceeding a molar equivalent of catalyst per mol of adduct used.

The preferred temperature range is from about 50° C. to about 140° C. although both higher (e. g. 150°-200° C.) or lower temperatures, even room temperature, can in many cases be used. Inert organic solvents such as dioxane, ethylene dichloride, or dibutyl ether may be used, if desired, to facilitate the stirring of the reaction mixture, particularly when solid carboxylic acids are used.

The following examples illustrate this invention, it being understood that the proportions, temperatures, and time can be varied to a considerable extent.

*Example 1*

A mixture consisting of 2 g. of 50% sulfuric acid, 30 g. of glacial acetic acid, and 17 g. of cyclopentadiene-styrene adduct

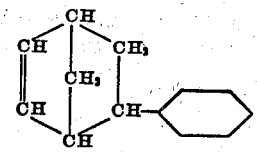

was stirred at 95° C. for four hours. The product was cooled, washed with water, then with dilute soda solution, dried, and distilled in vacuo.

The acetate of endoethylene-phenylcyclopentanol having the probable formula

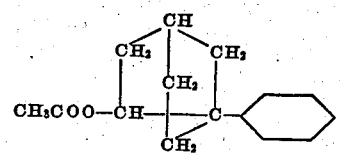

distilled over at 130°-135° C./1-2 mm. as a colorless oil in a yield of 17 grams. Upon redistillation the pure compound boiled at 128°-130° C./1 mm. The above compound may also be formulated $CH_3COO \cdot C_7H_{10} \cdot C_6H_5$, wherein $C_7H_{10}$ is the endoethylene cyclopentylene group.

*Example 2*

A mixture consisting of 2 g. of 50% sulfuric acid, 46 g. of 87% formic acid, and 17 g. of cyclopentadiene-styrene adduct was stirred four hours at 95° C. and worked up as in Example 1.

The formate of endoethylene-phenylcyclopentanol was obtained as a colorless oil having a boiling point of 118°-120° C./1.5 mm. The product has the formula $HCOO \cdot C_7H_{10} \cdot C_6H_5$, wherein $C_7H_{10}$ is the endoethylene cyclopentylene group.

*Example 3*

A mixture consisting of 0.1 g. of 98% sulfuric acid, 9.5 g. of monochloroacetic acid, and 17 g. of cyclopentadiene-styrene adduct was reacted and worked up as in Example 1 to yield the chloroacetate of endoethylene-phenylcyclopentanol as a colorless oil boiling at 167°-170° C./2 mm. having the probable formula

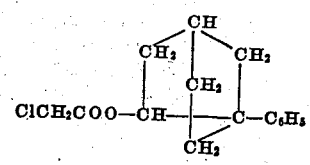

The product may also be given the formula $ClCH_2COO \cdot C_7H_{10} \cdot C_6H_5$, wherein $C_7H_{10}$ is the endoethylene cyclopentylene group.

Example 4

A mixture of 2 g. of $BF_3 \cdot O(C_4H_9)_2$, 12.2 g. of benzoic acid, and 17 g. of cyclopentadiene-styrene adduct was stirred for five hours at 95° C. and worked up as in Example 1.

The benzoate of endoethylene-phenyl cyclopentanol distilled over at 200°–210° C./1–2 mm. as a viscous, colorless oil.

Example 5

A mixture of 0.5 g. of $BF_3 \cdot O(C_2H_5)_2$, 9 g. of crotonic acid, and 17 g. of cyclopentadiene-styrene adduct was stirred for five hours at 95° C. and worked up as in Example 1.

The crotonate of endoethylene-phenylcyclopentanol distilled over at 160°–165° C./1.5 mm. as a faintly yellow thick oil.

Example 6

A mixture of 5 g. of 40% sulfuric acid, 120 g. of glacial acetic acid, and 62.5 g. of the adduct of cyclopentadiene with vinyl acetate

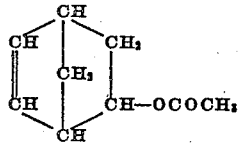

was stirred at 95° C. for four hours. The product was cooled, washed twice with water, dried and distilled in vacuo to yield 41 g. of the diacetate of endoethylene hydroxycyclopentanol as a colorless oil boiling at 142°–145° C. at 14 mm. having the probable formula

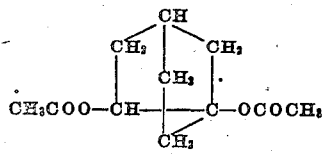

Example 7

A mixture of 5 g. of 40% sulfuric acid, 120 g. of glacial acetic acid, and 83 g. of the adduct of cyclopentadiene with allyl acetate

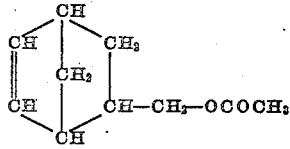

was stirred for five hours at 95° C. and worked up as in Example 6.

The diacetate of the endoethylene-hydroxymethylene cyclopentanol distilled over at 134°–136° C./5 mm. as a colorless oil having the probable formula

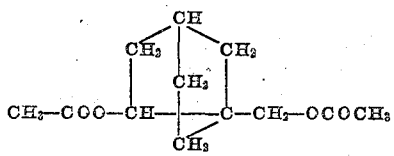

The yield amounted to 75 grams and possessed the following constants:

$n_D^{25}$ 1.4665; $d_4^{25}$ 1.1044

Upon hydrolysis with alcoholic sodium hydroxide solution, it yielded the corresponding endoethylene hydroxymethylene cyclopentanol as a colorless oil boiling at 150°–155° C./6 mm.

Example 8

A mixture of 23 g. of glycolic acid, 50 g. of cyclopentadiene-indene adduct (1,4-endomethylene-tetrahydro-fluorene)

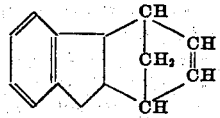

and 5 g. of $BF_3 \cdot O(C_2H_5)_2$ was stirred at 90°–95° C. for six hours. The product was cooled, washed with dilute sodium carbonate solution and then with water, dried, and distilled in vacuo to yield the glycolate of endoethylene-hydroxycyclopentanoindane having the probable formula

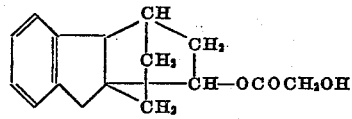

as a colorless balsam boiling at 185° C./1 mm.

Example 9

A mixture of 32 g. of 85% lactic acid, 5 g. of 98% sulfuric acid, and 54 g. of cyclopentadiene-indene adduct was stirred at 95° C. for six hours and worked up as in Example 8.

The lactate of endoethylene-hydroxy-cyclopentanoindane obtained is a viscous oil boiling at 175°–180° C./0.5–1 mm.

In the same manner, any of the other types of carboxylic acids enumerated herein may be used, the products in every case being esters of endoethylene-substituted cyclopentanol derivatives, all of which are new compounds.

These new compounds are of value as solvents, plasticizers, and chemical intermediates for the preparation of insecticides, pharmaceuticals and other allied products.

I claim:

1. As a new compound, an addition-rearrangement product of an aliphatic monocarboxylic acid of one to eighteen carbon atoms and cyclopentadiene-styrene adduct, bicyclo-(2,2,1)-3-phenyl-5-heptene, said product being an aliphatic carboxylic acid ester of endoethylene-phenylcyclopentanol and having the formula $RCOO \cdot C_7H_{10} \cdot C_6H_5$, wherein R is the residue of said acid and $C_7H_{10}$ is the endoethylene cyclopentylene group.

2. As a new compound, an addition-rearrangement product of acetic acid and cyclopentadiene-styrene adduct, said product being an acetate of endoethylene-phenylcyclopentanol $CH_3COO \cdot C_7H_{10} \cdot C_6H_5$ wherein $C_7H_{10}$ is the endoethylene cyclopentylene group.

3. As a new compound, an addition-rearrangement product of chloroacetic acid and cyclopentadiene-styrene adduct, said product being a chloroacetate of endoethylene-phenylcyclopentanol, $ClCH_2COO \cdot C_7H_{10} \cdot C_6H_5$, wherein $C_7H_{10}$ is the endoethylene cyclopentylene group.

4. As a new compound, an addition-rearrangement product of formic acid and cyclopentadiene-styrene adduct, said product being a formate of endoethylene-phenylcyclopentanol $HCOO \cdot C_7H_{10} \cdot C_6H_5$ wherein $C_7H_{10}$ is the endoethylene cyclopentylene group.

5. A method of preparing esters of endoethylene-substituted cyclopentanols which comprises reacting in the presence of an acidic condensing agent an aliphatic monocarboxylic acid of one to eighteen carbon atoms and an adduct of one mole of cyclopentadiene and one mole of a hydrocarbon selected from a member of the class consisting of propylene, cyclopentene, styrene, and allylbenzene, whereby there occurs an addition reaction together with a molecular rearrangement of the cyclic system of said adduct.

6. The method of claim 5 wherein the acidic condensing agent is a sulfuric acid catalyst.

7. The method of claim 5 wherein the acidic condensing agent is a boron trifluoride catalyst.

HERMAN A. BRUSON.

REFERENCES CITED

The following references are of record in the file of this patent:

UNITED STATES PATENTS

| Number | Name | Date |
| --- | --- | --- |
| 1,838,465 | Stephan et al. | Dec. 29, 1931 |
| 1,755,750 | Stephan et al. | Apr. 22, 1930 |
| 2,381,433 | Bruson | Aug. 7, 1945 |

OTHER REFERENCES (I) Nametkin et al., Ber. Deut. Chem. vol. 61 B (1928) pp. 1491–1494.

(II) Nametkin et al., Comptes Rendus Acad. Sci. U. R. S. S. vol. 36 (1942) pp. 142–144 (Avail. Dept. of Agri. Lib.).